US 11,656,910 B2

United States Patent
Chen et al.

(10) Patent No.: US 11,656,910 B2
(45) Date of Patent: May 23, 2023

(54) DATA SHARING SYSTEM AND DATA SHARING METHOD THEREFOR

(71) Applicant: Shanghai Cambricon Information Technology Co., Ltd, Pudong New Area (CN)

(72) Inventors: Tianshi Chen, Pudong New Area (CN); Shengyuan Zhou, Pudong New Area (CN); Shaoli Liu, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 584 days.

(21) Appl. No.: 16/693,999

(22) Filed: Nov. 25, 2019

(65) Prior Publication Data

US 2020/0089534 A1 Mar. 19, 2020

Related U.S. Application Data

(63) Continuation of application No. 16/693,918, filed on Nov. 25, 2019, now Pat. No. 10,901,815, which is a
(Continued)

(30) Foreign Application Priority Data

Aug. 21, 2017 (CN) .......................... 201710721049.X

(51) Int. Cl.
*G06F 9/50* (2006.01)
*G06N 3/04* (2023.01)
(Continued)

(52) U.S. Cl.
CPC ............ *G06F 9/505* (2013.01); *G06F 9/4881* (2013.01); *G06F 9/5066* (2013.01); *G06N 3/02* (2013.01);
(Continued)

(58) Field of Classification Search
CPC ............ G06F 2209/5017; G06F 9/505; G06F 9/5066; G06N 3/02; G06N 3/04; G06N 3/08; G06N 3/0454
See application file for complete search history.

(56) References Cited

U.S. PATENT DOCUMENTS 8,635,412 B1 1/2014 Wilshire
2007/0226718 A1 9/2007 Watanabe
(Continued)

FOREIGN PATENT DOCUMENTS

CN 1200513 A 12/1998
CN 1522402 A 8/2004
(Continued)

OTHER PUBLICATIONS

Xiao, Ding, et al., Resource Prediction Based on Program Granularity Combined with Data Purification, 12th International Conference on Fuzzy Systems and Knowledge Discovery (FSKD), Aug. 15-17, 2015, 7 pages, [retrieved on Jan. 3, 2023], Retrieved from the Internet: <URL:http://ieeexplore.ieee.org/>.*
(Continued)

*Primary Examiner* — Geoffrey R St Leger
(74) *Attorney, Agent, or Firm* — Getech Law LLC; Jun Ye

(57) ABSTRACT

The disclosure provides a task segmentation device and method, a task processing device and method, a multi-core processor. The task segmentation device includes a granularity task segmentation unit configured to segment a task by adopting at least one granularity to form subtasks, and a task segmentation granularity selection unit configured to select the granularity to be adopted.

15 Claims, 2 Drawing Sheets

Related U.S. Application Data continuation-in-part of application No. PCT/CN2018/092829, filed on Jun. 26, 2018.

(51) Int. Cl.
 *G06N 3/02* (2006.01)
 *G06N 5/01* (2023.01)
 *G06F 9/48* (2006.01)
 *G06N 3/08* (2023.01)

(52) U.S. Cl.
 CPC ............ *G06N 3/04* (2013.01); *G06N 3/08* (2013.01); *G06N 5/01* (2023.01); *G06F 2209/5017* (2013.01)

(56) References Cited

U.S. PATENT DOCUMENTS

| | | | |
|---|---|---|---|
| 2009/0265500 A1 | 10/2009 | Kyusojin | |
| 2010/0125847 A1* | 5/2010 | Hayashi | G06F 9/505 718/102 |
| 2012/0131283 A1 | 5/2012 | Mital et al. | |
| 2012/0198466 A1* | 8/2012 | Cherkasova | G06F 9/5066 718/104 |
| 2013/0117305 A1* | 5/2013 | Varakin | G06F 9/5072 707/769 |
| 2013/0160023 A1* | 6/2013 | Suzuki | G06F 9/4887 718/104 |
| 2015/0040136 A1* | 2/2015 | Matthes | G06F 9/5094 718/104 |
| 2015/0106819 A1* | 4/2015 | Kim | G06F 9/5038 718/103 |
| 2016/0103743 A1 | 4/2016 | Sanghi et al. | |
| 2016/0179434 A1 | 6/2016 | Herrero Abellanas et al. | |
| 2016/0217198 A1 | 7/2016 | Lee et al. | |
| 2017/0075734 A1* | 3/2017 | Raman | G06F 9/5038 |
| 2017/0093639 A1* | 3/2017 | Dabbagh | H04L 43/08 |
| 2017/0102971 A1* | 4/2017 | Blagodurov | G06F 9/5038 |
| 2017/0169812 A1 | 6/2017 | Lample et al. | |
| 2021/0312260 A1* | 10/2021 | Wu | G06N 3/084 |

FOREIGN PATENT DOCUMENTS

| | | |
|---|---|---|
| CN | 1588425 A | 3/2005 |
| CN | 1702858 A | 11/2005 |
| CN | 101739867 A | 6/2010 |
| CN | 101980149 A | 2/2011 |
| CN | 102184157 A | 9/2011 |
| CN | 102741828 A | 10/2012 |
| CN | 102831011 A | 12/2012 |
| CN | 102866912 A | 1/2013 |
| CN | 102930866 A | 2/2013 |
| CN | 103019656 A | 4/2013 |
| CN | 103177733 A | 6/2013 |
| CN | 103347037 A | 10/2013 |
| CN | 103530600 A | 1/2014 |
| CN | 103928023 A | 7/2014 |
| CN | 104021042 A | 9/2014 |
| CN | 104268603 A | 1/2015 |
| CN | 104281540 A | 1/2015 |
| CN | 104463101 A | 3/2015 |
| CN | 104464423 A | 3/2015 |
| CN | 104978971 A | 10/2015 |
| CN | 105159762 A | 12/2015 |
| CN | 105512723 A | 4/2016 |
| CN | 105678253 A | 6/2016 |
| CN | 105793830 A | 7/2016 |
| CN | 106056212 A | 10/2016 |
| CN | 106062786 A | 10/2016 |
| CN | 106407145 A | 2/2017 |
| CN | 106502806 A | 3/2017 |
| CN | 106682702 A | 5/2017 |
| CN | 106781784 A | 5/2017 |
| CN | 106897248 A | 6/2017 |
| CN | 106909971 A | 6/2017 |
| CN | 107590531 A | 1/2018 |
| CN | 107832768 A | 3/2018 |
| CN | 107992329 A | 5/2018 |
| WO | 2015042904 A1 | 4/2015 |

OTHER PUBLICATIONS

EP18824582.3, Response to Extended European Search Report dated Aug. 20, 2020, dated Feb. 18, 2021, 13 pages.
EP18824582.3, Response to the Invitation to File Search Results Pursuant to Rule 70b(1) EPC dated Mar. 1, 2021, filed Mar. 4, 2021, 16 pages.
CN201810407185.6, Office Action, dated May 2, 2021, 10 pages. (No. English Translation).
CN201710515517.8—Office Action dated Jul. 31, 2020, 13 pages. (No English Translation).
Li Hong, The application of BP Neural Network in Image Correcting Work Based on Matlab Platform, Journal of Langfang Teachers College (Natural Science Edition), vol. 15 No. 1, Feb. 2015, 4 pages.
CN201710497394.X—Office Action, dated May 8, 2020, 11 pages (No English Translation).
CN201710497394.X—Second Office Action, dated Dec. 18, 2020, 8 pages (No English Translation).
Yu Zijian, et al., "FPGA-Based Accelerator for Convolutional Neural Network", Computer Engineering, 2017, 7 pages.
Shijin Zhang, et. al., "Cambricon-X: An Accelerator for Sparse Neural Networks", IEEE, 2016, 12 pages.
Shaoli Liu, et al., "Cambricon: An Instruction Set Architecture for Neural Networks", ACM/IEEE, 2016, 13 pages.
CN201710721049.X, Office Action, dated Apr. 23, 2020, 12 pages. (No English Translation).
CN201710721049.X, Second Office Action, dated Nov. 24, 2020, 8 pages. (No English Translation).
CN201810407185.6, Office Action, dated May 27, 2020, 11 pages. (No English Translation).
Shun-Wen Cheng, "Configurable CMOS H-tree Logic Module", Dept. of Electronic Engineering, Far East University, IEEE, 2009, 4 pages.
PCT/CN2018092829, EP18824582.3, Extended European Search Report, dated Aug. 3, 2020, 9 pages.
PCT/CN2018092829, Search Report, dated Sep. 17, 2018, 10 pages. (No English Translation).
CN201710515517.8—Office Action, dated Feb. 23, 2022, 23 pages, (with English translation).
CN201810467383.1—Office Action, dated Aug. 27, 2021, 21 pages, (with English translation).
CN201810641721.9—Office Action, dated Oct. 9, 2021, 24 pages, (with English translation).
Goodfellow et al., "Generative Adversarial Nets", Jun. 10, 2014, 9 pages.
CN 201710515517.8—Notification to Grant Patent Right for Invention, dated Nov. 1, 2022, 5 pages.
EP18824582.3—Communication pursuant to Article 94(3) EPC dated Feb. 28, 2023, 7 pages.

* cited by examiner

DATA SHARING SYSTEM AND DATA SHARING METHOD THEREFOR

TECHNICAL FIELD

The disclosure relates to the field of data processing, and particularly to a task segmentation device and method, a task processing device and method, and a multi-core processor.

BACKGROUND

Neural network and neural network processor have been successfully applied. With the increasing scale of neural network, multi-core neural network processor has gradually replaced single-core neural network processor. However, when the traditional task scheduling method is applied to the multi-core neural network processor, there are some problems such as low service quality, low kernel utilization rate, unbalanced load and large energy consumption. Therefore, how to perform task segmentation and task scheduling on neural network for multi-core neural network processor becomes an urgent problem to be solved.

SUMMARY

The disclosure provides a task segmentation device and method, a task processing device and method, and a multi-core processor, so as to solve the above technical problems.

According to an aspect of the disclosure, a task segmentation device is provided, which may include a granularity task segmentation unit configured to segment a task into one or more subtasks in accordance with at least one granularity; and a task segmentation granularity selection unit configured to determine the granularity for segmenting the task.

In some embodiments, the granularity task segmentation unit includes at least one of a first granularity task segmentation unit configured to identify the task as one of the one or more subtask, a second granularity task segmentation unit configured to divide sample data associated with the task into one more subset of sample data, and identify a computation of each subset of sample data as one of the one or more subtask, a third granularity task segmentation unit configured to segment the task according to layer types of the neural network, wherein computation for layers of the same layer type is identified as one of the one or more subtask, a fourth granularity task segmentation unit configured to segment the task according to an interlayer structure of the neural network, wherein computation for multiple adjacent layers is identified as one of the one or more subtask, and a fifth granularity task segmentation unit configured to segment the task according to intra-layer structures of the neural network to segment computation types in each of the layers of the neural network into subtasks.

In some embodiments, the task segmentation granularity selection unit may be configured to select at least one of the first to fifth granularity task segmentation units for task segmentation on the basis of at least one of the count of samples to be processed of the neural network, a topological structure of the neural network, and a computation amount of each layer.

In some embodiments, the fifth granularity task segmentation unit may be further configured to segment the task based on computation types including convolutional layer computation, fully connected layer computation, pooling layer computation, or active layer computation of the neural network.

In some embodiments, the fifth granularity task segmentation unit may be configured to identify the convolutional layer computation as one of the subtasks by performing segmentation on the output neurons according to a block size of (Bfout, Bxout, Byout), and simultaneously performing segmentation on the weights according to a block size of (Bfout, Bfin, Bx, By), where all of Bfout, Bxout, Byout, Bfout, Bfin, Bx and By are positive integers, and $0<Bfout \leq Nfout$, $0<Bxout \leq Nxout$, $0<Byout \leq Nyout$, $0<Bfin \leq Nfin$, $0<Bx \leq K$ and $0<By \leq Ky$; when input neurons of a convolutional layer of the neural network form a three-dimensional matrix (Nfin, Nxin, Nyin), weights form a four-dimensional matrix (Nfout, Nfout, Kx, Ky), output neurons form a three-dimensional matrix (Nfout, Nxout, Nyout), where Nfin represents the count of input feature image, (Nxin, Nyin) represents a size of input feature image, Nfout represents the count of output feature image, (Kx, Ky) represents a size of convolution kernel, (Nxout, Nyout) represents an output feature image size, and all of Nfin, Nxin, Nyin, Kx, Ky, Nfout, Nxout, and Nyout are positive integers.

The disclosure may further include a task processing device. The task processing device may include a task segmentation device; and a task scheduling device that includes: a task queue unit configured to cache unscheduled tasks; a monitoring unit configured to monitor a working state of each core of a multi-core processor in real time; and a task scheduling unit configured to select a task to be scheduled from the unscheduled tasks, and allocate and schedule the task to be scheduled to a target core according to the working state of each core.

In some embodiments, the task scheduling unit may be configured to count a number of tasks in a private task queue of each core and selecting the core with the fewest tasks in the private task queue as the target core.

In some embodiments, the task scheduling unit may be configured to track time for completion of all the tasks in the private task queue of each core and selecting the core of which the task completion time is shortest as the target core.

In some embodiments, the task scheduling unit may be configured to monitor a distribution condition of resources required by the task to be scheduled in all the cores and selecting the core with the most resources as the target core.

In some embodiments, the task scheduling unit may be configured to allocate the task to be scheduled to the target core by adopting a heuristic algorithm.

In some embodiments, the task scheduling unit may be configured to perform task scheduling at a time interval, and select the task to be scheduled in at least one of the following manners: randomly selecting an unscheduled task, selecting the unscheduled task of which estimated execution time is longest, selecting the unscheduled task of which the estimated execution time is shortest, selecting the unscheduled task occupying most resources, and selecting the unscheduled task occupying fewest resources.

In some embodiments, the working state of each core includes at least one of a utilization rate, a workload, a working frequency, a count of the tasks in the private task queue in the core, and the task completion time in the core.

The disclosure may further include a task segmentation method for a neural network, comprising segmenting, by a granularity task segmentation unit, a task into one or more subtasks in accordance with at least one granularity; and determining, by a task segmentation granularity selection unit, the granularity for segmenting the task.

In some embodiments, the method may further include dividing, by a second granularity task segmentation unit of the granularity task segmentation unit, sample data associated with the task into one more subset of sample data; and identifying, by the second granularity task segmentation unit of the granularity task segmentation unit, a computation of each subset of sample data as a subtask.

In some embodiments, the method may further include segmenting, by a third granularity task segmentation unit of the granularity task segmentation unit, the task according to layer types of the neural network, where computation for layers of the same layer type is identified as a subtask.

In some embodiments, the method may further include segmenting, by a fourth granularity task segmentation unit of the granularity task segmentation unit, the task according to an interlayer structure of the neural network, where computation for multiple adjacent layers is identified as a subtask.

In some embodiments, the method may further include segmenting, by a fifth granularity task segmentation unit of the granularity task segmentation unit, the task according to intra-layer structures of the neural network to segment computation types in each of the layers of the neural network into subtasks.

In some embodiments, the task segmentation may be performed by selecting at least one unit in a task segmentation device for task segmentation on the basis of at least one of the count of samples to be processed of the neural network, a topological structure of the neural network, and a computation amount of each layer.

In some embodiments, the method may further include performing task segmentation on convolutional layer computation, fully connected layer computation, pooling layer computation or active layer computation of the neural network.

In some embodiments, the method may further include performing segmentation on the output neurons according to a block size of (Bfout, Bxout, Byout), and simultaneously performing segmentation on the weights according to a block size of (Bfout, Bfin, Bx, By), where all of Bfout, Bxout, Byout, Bfout, Bfin, Bx and By are positive integers, $0<Bfout \leq Nfout$, $0<Bxout \leq Nxout$, $0<Byout \leq Nyout$, $0<Bfin \leq Nfin$, $0<Bx \leq K$ and $0<By \leq Ky$, when input neurons of a convolutional layer of the neural network form a three-dimensional matrix (Nfin, Nxin, Nyin), weights form a four-dimensional matrix (Nfout, Nfout, Kx, Ky) and output neurons form a three-dimensional matrix (Nfout, Nxout, Nyout), where Nfin represents the count of input feature image, (Nxin, Nyin) is a size of input feature image, Nfout represents the count of output feature image, (Kx, Ky) represents a convolution kernel size, (Nxout, Nyout) represents a size of output feature image and all of Nfin, Nxin, Nyin, Kx, Ky, Nfout, Nxout, Nyout are positive integers.

In some embodiments, the task segmentation device is configured for a neural network, and the granularity task segmentation unit may include at least one of the following units: a first granularity task segmentation unit, a second granularity task segmentation unit, a third granularity task segmentation unit, a fourth granularity task segmentation unit, and a fifth granularity task segmentation unit. The first granularity task segmentation unit may be configured to take the whole task as a subtask. The second granularity task segmentation unit may be configured to segment the task by selecting part of sample calculation in the task as a subtask. The third granularity task segmentation unit may be configured to perform task segmentation according to layer types of the neural network, calculation for layers of the same type being taken as a subtask. The fourth granularity task segmentation unit may be configured to perform task segmentation according to an interlayer structure of the neural network, in which calculation for multiple adjacent layers may be taken as a subtask. The fifth granularity task segmentation unit may be configured to perform task segmentation according to intra-layer structures of the neural network to segment calculation in the layers of the neural network into subtasks.

In some embodiments, the task segmentation granularity selection unit selects at least one of the first to fifth granularity task segmentation units for task segmentation on the basis of at least one of the count of samples to be processed of the neural network, a topological structure of the neural network and a calculation amount of each layer.

In some embodiments, performing task segmentation according to the intra-layer structures of the neural network may include the follows. Task segmentation may be performed on convolutional layer calculation, fully connected layer calculation, pooling layer calculation or active layer calculation of the neural network.

In some embodiments, segmenting convolutional layer calculation of the neural network may include the follows. Input neurons of a convolutional layer of the neural network form a three-dimensional matrix (Nfin, Nxin, Nyin). Weights form a four-dimensional matrix (Nfout, Nfout, Kx, Ky). Output neurons form a three-dimensional matrix (Nfout, Nxout, Nyout). Nfin represents the count of input feature image. (Nxin, Nyin) represents the size of input feature image. Nfout represents the count of output feature image. (Kx, Ky) represents the size of convolution kernel. (Nxout, Nyout) represents an output feature image size. All of Nfin, Nxin, Nyin, Kx, Ky, Nfout, Nxout, and Nyout are positive integers. Then, the output neurons are segmented according to a block size of (Bfout, Bxout, Byout), and the weights are simultaneously segmented according to a block size of (Bfout, Bfin, Bx, By). All of Bfout, Bxout, Byout, Bfout, Bfin, Bx and By are positive integers, and $0<Bfout \leq Nfout$, $0<Bxout \leq Nxout$, $0<Byout \leq Nyout$, $0<Bfin \leq Nfin$, $0<Bx \leq K$ and $0<By \leq Ky$.

According to another aspect of the disclosure, a task processing device is provided, which may include a task segmentation device and a task scheduling device. The task scheduling device may include a task queue unit configured to cache unscheduled tasks, a monitoring unit configured to monitor the working state of each core of a multi-core processor in real time, and a task scheduling unit configured to select a task to be scheduled from the unscheduled tasks and allocate and schedule the task to be scheduled to a target core according to the working state of each core.

In some embodiments, the task scheduling unit may be configured to allocate and schedule the task to be scheduled to the target core in at least one of the following manners. The task scheduling unit may be configured to make statistics on the count of tasks in a private task queue of each core and to select the core with the fewest tasks in the private task queue as the target core. The task scheduling unit may be configured to make statistics on time for completion of all the tasks in the private task queue of each core and to select the core of which the task completion time is shortest as the target core. The task scheduling unit may be configured to make statistics on a distribution condition of resources required by the task to be scheduled in all the cores, to select the core with the most resources as the target core, and to allocate the task to be scheduled to the target core by adopting a heuristic algorithm.

In some embodiments, the heuristic algorithm may include at least one of a genetic algorithm, an ant colony algorithm, and a simulated annealing algorithm.

In some embodiments, the task scheduling unit may be configured to perform task scheduling at a time interval T, and to select the task to be scheduled in at least one of the following manners.

The task scheduling unit may be configured to randomly select an unscheduled task. The task scheduling unit may be configured to select the unscheduled task of which estimated execution time is longest. The task scheduling unit may be configured to select the unscheduled task of which the estimated execution time is shortest. The task scheduling unit may be configured to select the unscheduled task occupying most resources and the unscheduled task occupying fewest resources.

In some embodiments, the working state of each core may include at least one of a utilization rate, a workload, a working frequency, a count of the tasks in the private task queue in the core and the task completion time in the core.

According to another aspect of the disclosure, a multi-core processor is provided, which may include J processing cores and a task processing device. J is a positive integer.

In some embodiments, a topological structure between the processing cores may adopt at least one of a one-dimensional linear structure, a two-dimensional mesh structure, a two-dimensional star structure, and a three-dimensional cube structure.

In some embodiments, the processing cores may include a neural network processing core, and the neural network processing core may include the following units: a storage unit, a data selection unit, a computation unit, and a controlling unit. The storage unit may be configured to store neurons, weights and instruction of a neural network. The data selection unit may be configured to receive input neurons and non-zero weight position information and select the neurons corresponding to non-zero weights. The computation unit may be configured to receive the neurons corresponding to the input non-zero weights and the corresponding non-zero weights and complete neural network training computation. The controlling unit may be configured to receive the instruction of the neural network and decode it to generate control information to control the data selection unit and the computation unit.

In some embodiments, the instruction may include at least one of a control instruction, a data transfer instruction, a computational instruction and a logical instruction.

In some embodiments, the computational instruction may be configured to complete arithmetic computation of the neural network, and may include at least one of a matrix computational instruction, a vector computational instruction, a scalar computational instruction, a convolutional neural network computational instruction, a fully connected neural network computational instruction, a pooling neural network computational instruction, a Restricted Boltzmann Machine (RBM) neural network computational instruction, a Local Response Normalization (LRN) neural network computational instruction, a Local Contrast Normalization (LCN) neural network computational instruction, a Long Short-Term Memory (LSTM) neural network computational instruction, a Recurrent Neural Networks (RNN) computational instruction, a Rectified Linear Unit (RELU) neural network computational instruction, a Parametric Rectified Linear Unit (PRELU) neural network computational instruction, a SIGMOID neural network computational instruction, a TANH neural network computational instruction and a MAXOUT neural network computational instruction.

According to another aspect of the disclosure, a task segmentation method is provided, which is adapted to a neural network. At least one of the following task segmentation manners is selected for task segmentation. The whole task is taken as a subtask. The task is segmented by selecting part of sample calculation in the task as a subtask. Task segmentation may be performed according to layer types of the neural network, in which calculation for layers of the same type may be taken as a subtask. Task segmentation may be performed according to an interlayer structure of the neural network, in which calculation for multiple adjacent layers may be taken as a subtask. Task segmentation may be performed according to intra-layer structures of the neural network to segment calculation in the layers of the neural network into subtasks.

In some embodiments, at least one unit in a task segmentation device is selected for task segmentation on the basis of at least one of the count of samples to be processed of the neural network, a topological structure of the neural network and a calculation amount of each layer.

In some embodiments, performing task segmentation according to the intra-layer structures of the neural network may include: performing task segmentation on convolutional layer calculation, fully connected layer calculation, pooling layer calculation or active layer calculation of the neural network.

In some embodiments, segmenting convolutional layer calculation of the neural network may include the follows. Input neurons of a convolutional layer of the neural network form a three-dimensional matrix (Nfin, Nxin, Nyin). Weights form a four-dimensional matrix (Nfout, Nfout, Kx, Ky) and output neurons form a three-dimensional matrix (Nfout, Nxout, Nyout). Nfin represents the count of input feature image. (Nxin, Nyin) is the size of input feature image. Nfout represents the count of output feature image. (Kx, Ky) represents a convolution kernel size. (Nxout, Nyout) represents the size of output feature image and all of Nfin, Nxin, Nyin, Kx, Ky, Nfout, Nxout, and Nyout are positive integers. Then, the output neurons are segmented according to a block size of (Bfout, Bxout, Byout), and the weights are simultaneously segmented according to a block size of (Bfout, Bfin, Bx, By). All of Bfout, Bxout, Byout, Bfout, Bfin, Bx and By are positive integers, $0 < Bfout \leq Nfout$, $0 < Bxout \leq Nxout$, $0 < Byout \leq Nyout$, $0 < Bfin \leq Nfin$, $0 < Bx \leq K$ and $0 < By \leq Ky$.

According to a further aspect of the disclosure, a task processing method is provided, which may include a task segmentation method and a task scheduling method. The task scheduling method may include the follows. Unscheduled tasks may be cached, and the unscheduled tasks may include subtasks segmented by any task segmentation device in the claims. The working state of each core of a multi-core processor may be monitored in real time. A task to be scheduled may be selected from the unscheduled tasks, and the task to be scheduled may be allocated and scheduled to a target core according to the working state of each core.

In some embodiments, allocating and scheduling the task to be scheduled to the target core may be performed in at least one of the following manners: making statistics on the count of tasks in a private task queue of each core and selecting the core with the fewest tasks in the private task queue as the target core; making statistics on time for completion of all the tasks in the private task queue of each core and selecting the core of which the task completion time is shortest as the target core; making statistics on a distribution condition of resources required by the task to be scheduled in all the cores and selecting the core with the most resources as the target core; allocating the task to be scheduled to the target core by adopting a heuristic algorithm.

In some embodiments, the heuristic algorithm may include at least one of a genetic algorithm, an ant colony algorithm and a simulated annealing algorithm.

In some embodiments, task scheduling may be performed at a time interval T, and the task to be scheduled may be selected in at least one of the following manners: randomly selecting an unscheduled task; selecting the unscheduled task of which estimated execution time is longest; selecting the unscheduled task of which the estimated execution time is shortest; selecting the unscheduled task occupying most resources; selecting the unscheduled task occupying fewest resources.

In some embodiments, the working state of each core may include at least one of a utilization rate, a workload, a working frequency, the count of the tasks in the private task queue in the core and the task completion time in the core.

Task scheduling may be implemented in comprehensive consideration of a dependency relationship between tasks, task locality, a task segmentation granularity, and running frequencies and loads of cores to improve quality of service, increase utilization rates of the cores, ensure task balance between the cores and reduce energy consumption.

DETAILED DESCRIPTION OF THE EMBODIMENTS

In order to make the purpose, technical solutions and advantages of the disclosure clearer, the disclosure will further be described below in combination with specific embodiments and with reference to the drawings in detail.

Figure 1:
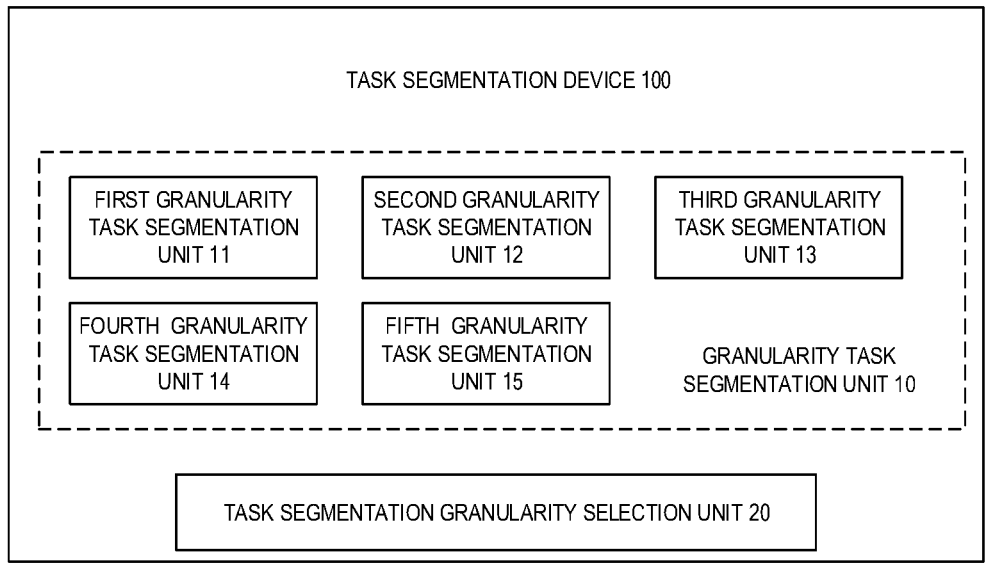
FIG. 1 is a structure block diagram of a task segmentation device according to an embodiment of the disclosure.

An embodiment of the disclosure provides a task segmentation device. FIG. 1 is a structure block diagram of the task segmentation device according to an embodiment of the disclosure. As illustrated in FIG. 1, the task segmentation device 100 may include a granularity task segmentation unit 10 and a task segmentation granularity selection unit 20. The granularity task segmentation unit 10 segments a task by adopting at least one granularity to form subtasks to provide multi-granularity task segmentation selection for a neural network application. The task segmentation granularity selection unit 20 selects the granularity to be adopted for task division to guide a neural network to select the most suitable task segmentation granularity to ensure that the subtasks obtained by segmentation may meet system real-time performance.

In an embodiment, as illustrated in FIG. 1, the granularity task segmentation unit 10 may include a first granularity task segmentation unit 11, a second granularity task segmentation unit 12, a third granularity task segmentation unit 13, a fourth granularity task segmentation unit 14 and a fifth granularity task segmentation unit 15.

The five granularity task segmentation units will be specifically introduced below. Assuming that the neural network application is required to complete calculation for M samples and a topological structure of the neural network is formed by N layers, and M and N are positive integers greater than 0.

The first granularity task segmentation unit 11 takes the whole task as a subtask, and specifically, completion of calculation for the M samples is taken as a subtask. In such a task segmentation manner, only one subtask is generated, and there is no dependency relationship between subtasks.

The second granularity task segmentation unit 12 takes completion of calculation for multiple samples as a subtask. In other words, the second granularity task segmentation unit may be configured to divide sample data associated with the task into one or more subset of sample data and identify a computation of each subset of sample data as one subtask. The neural network is segmented into m subtasks, and the $i^{th}$ task completes calculation for Mi samples. M is a positive integer greater than 1 and less than or equal to M, 1=1, 2, 3, ... m, Mi is a positive integer greater than 0 and less than M and M1+M2+ ... +Mm=A is met. There is no dependency relationship between the m subtasks obtained in such a task segmentation manner.

The third granularity task segmentation unit 13 may perform task segmentation on the neural network application according to layer types of the neural network, calculation for layers of the same type being taken as a task. The layer types of the neural network may include, but are not limited to, a convolutional layer, a fully connected layer, an LSTM layer, a pooling layer, an active layer, an LRN layer and a Batch Normalization (BN) layer. There is a complex dependency relationship between subtasks obtained in such a task segmentation manner.

The fourth granularity task segmentation unit 14 may perform task segmentation on the neural network application according to an interlayer structure of the neural network, calculation for multiple adjacent layers being taken as a subtask. The neural network application is segmented into n subtasks, a first subtask completes calculation for a first layer to $N1^{th}$ layer, total N1 layers, of the neural network. A second subtask completes neural network calculation for an $(N/+)^{th}$ layer to an $(N/+N2)^{th}$ layer, total N2 layers and an $i^{th}$ subtask completes calculation for an $(N1+ \ldots +Ni-1+1)^{th}$ layer to an $(N1+ \ldots +Ni)^{th}$ layer, total Ni layers. n is a positive integer greater than 0 and less than or equal to N, 1=1, 2, 3, ... n, Ni being a positive integer greater than 0 and less than or equal to N and N1+N2+ ... +Ni+ ... +Nn=N is met. There is a chain dependency relationship between the subtasks obtained in such a task segmentation manner, wherein the $i^{th}$ subtask is a precursor task of an (i+1)th subtask, the (i+1)th subtask is a subsequent task of the $i^{th}$ task, and execution of the $(i+1)^{th}$ task may be started only after the $i^{th}$ task is completed.

The fifth granularity task segmentation unit 15 may perform task segmentation on the neural network application according to intra-layer structures of the neural network, and calculation in the layers of the neural network may be further segmented into subtasks. Segmentation according to calculation in the layers of the neural network may include, but is not limited to, task segmentation on convolutional layer calculation, fully connected layer calculation, pooling layer calculation or active layer calculation of the neural network.

Task segmentation may be performed on the convolutional layer calculation of the neural network. Input neurons of the convolutional layer form a three-dimensional matrix (Nfin, Nxin, Nyin). Weights form a four-dimensional matrix (Nfout, Nfout, Kx, Ky) and output neurons form a three-dimensional matrix (Nfout, Nxout, Nyout). Nfin is the count of input feature image. (Nxin, Nyin) is an input feature image size. Nfout is the count of output feature image. (Kx, Ky) is a convolution kernel size, and (Nxout, Nyout) is an output feature image size. Multiplication and addition computation is required to be performed for Nfin×Kx×Ky times for completion of an output neuron, an output neuron number is Nfout×Nxout×Nyout, and the multiplication and addition computation is required to be performed for total Nfout×Nxout×Nyout×Nfin×Kx×Ky times for completion of the whole convolutional layer. During task segmentation, the output neurons are segmented according to a block size of (Bfout, Bxout, Byout), and the weights are simultaneously segmented according to a block size of (Bfout, Bfin, Bx, By). Then, each subtask calculates intermediate results of Bfout×Bxout×Byout output neurons by use of weights (Bfout, Bfin, Bx, By). The multiplication and addition computation may be performed for Bfin×Bx×By times for the intermediate result of each output neuron, and the multiplication and addition computation is required to be completed for total Bfout× Bxout× Byout× Bfin× Bx× By times. Bfout represents a positive integer greater than 0 and less than or equal to Nfout. Bxout represents a positive integer greater than 0 and less than equal to Nxout. Byout represents a positive integer greater than 0 and less than or equal to Nyout. Bfin represents a positive integer greater than 0 and less than or equal to Nfin. Bx represents a positive integer greater than 0 and less than or equal to Kx. By represents a positive integer greater than 0 and less than or equal to Ky. There is no dependency relationship between the subtasks obtained in such a task segmentation manner.

Task segmentation may be performed on the fully connected layer calculation of the neural network. Input neurons of the fully connected layer are Nin. Weights form a two-dimensional matrix (Nout, Nin) and output neurons are Nout. Nin is an input neuron number, and Nout is an output neuron number. Multiplication and addition computation is required to be performed for Nin times for completion of an output neuron, the output neuron number is Nout, and the multiplication and addition computation is required to be performed for total Nout×Nin times for completion of the whole fully connected layer. During task segmentation, the output neurons are segmented according to a block size of Bout, and the weights are simultaneously segmented according to a block size of (Bout, Bin). Then, each subtask calculates intermediate results of Bout output neurons by use of weights (Bout, Bin). The multiplication and addition computation is required to be performed for Bin times for the intermediate result of each output neuron, and the multiplication and addition computation is required to be completed for total Bout×Bin times. Bout is a positive integer greater than 0 and less than or equal to Nout, and Bin is a positive integer greater than 0 and less than or equal to Nin. There is no dependency relationship between the subtasks obtained in such a task segmentation manner.

Task segmentation may be performed on the pooling layer calculation of the neural network. Input neurons of the pooling layer are Nin and output neurons are Nout. Nin and Nout are positive integers greater than 0. A pooling operation may include, but is not limited to, avgpooling, maxpooling and median pooling. During task segmentation, the output neurons are segmented according to a block size of Bout, and each subtask completes calculation for Bout output neurons. Bout is a positive integer greater than 0 and less than or equal to Nout and Bin is a positive integer greater than 0 and less than or equal to Nin. There is no dependency relationship between the subtasks obtained in such a task segmentation manner.

Task segmentation may be performed on the active layer calculation of the neural network. Input neurons of the active layer are Nin and output neurons are Nout. Nin and Nout are positive integers greater than 0. An activation function may include, but is not limited to, sigmoid, tan h, relu and softmax. During task segmentation, the output neurons are segmented according to a block size of Bout, and each subtask completes calculation for Bout output neurons, wherein Bout is a positive integer greater than 0 and less than or equal to Nout. There is no dependency relationship between the subtasks obtained in such a task segmentation manner.

When selecting the granularity to be adopted for task division, the task segmentation granularity selection unit 20 is not limited to select the above-mentioned granularity only, and a combination of multiple granularities may also be selected. For example, segmentation manners of the fourth granularity task segmentation unit and the fifth granularity task segmentation unit may be combined for a neural network application. The neural network application is segmented into n subtasks at first according to the segmentation manner of the fourth granularity task segmentation unit 14, and then p subtasks are segmented according to the segmentation manner of the fifth granularity task segmentation unit 15.

In another embodiment, the granularity task segmentation unit 10 may include at least one of the first to fifth granularity task segmentation units and not always may include all of the first to fifth granularity task segmentation units.

In another embodiment, the granularity task segmentation unit 10 may further include a hybrid granularity task segmentation unit configured to combine segmentation manners of the first to fifth granularity task segmentation units for the task segmentation granularity selection unit 20 to select.

Figure 2:
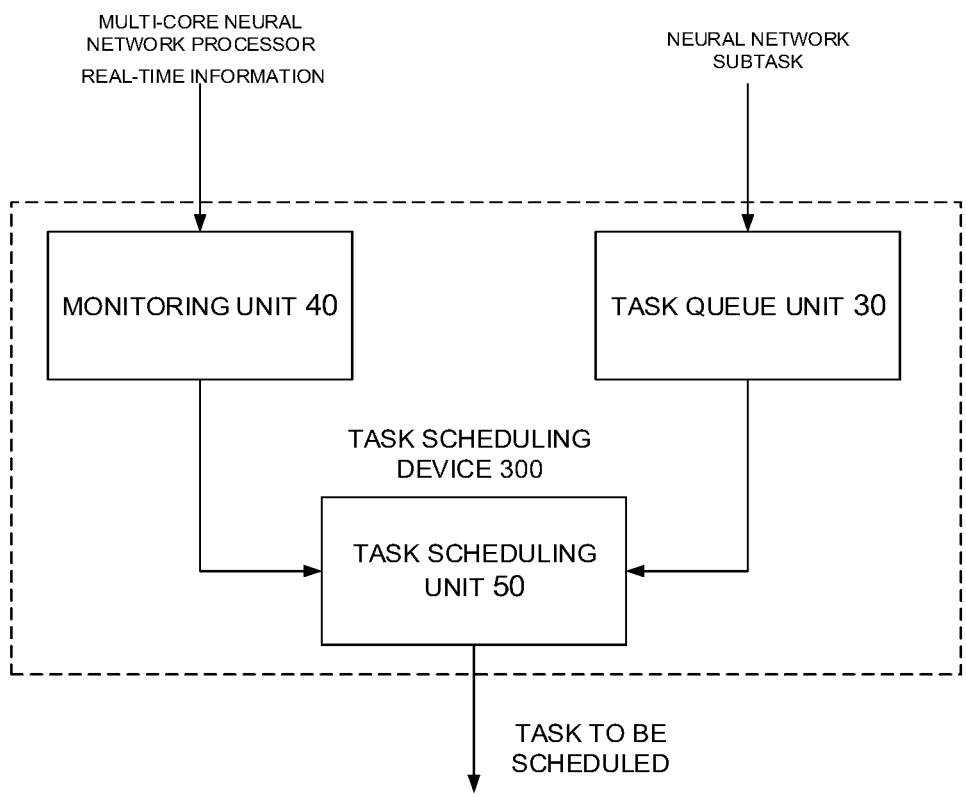
FIG. 2 is a structure block diagram of a task scheduling device according to an embodiment of the disclosure.

Another embodiment of the disclosure provides a task scheduling device. FIG. 2 is a structure block diagram of a task scheduling device according to an embodiment of the disclosure. As illustrated in FIG. 2, the task scheduling device 300 may include a task queue unit 30, a monitoring unit 40 and a task scheduling unit 50. The neural network task scheduling device 300 may implement task scheduling in comprehensive consideration of a dependency relationship between tasks, limitations of the tasks, a task segmentation granularity and running frequencies and loads of cores to improve quality of service, increase utilization rates of the cores, ensure task balance between the cores and reduce energy consumption.

The task queue unit 30 caches all unscheduled neural network tasks and may selectively store execution time of each task to be scheduled, a task dependency relationship diagram and a processing distribution condition of task resources in the cores. The neural network tasks are, for example, the subtasks segmented in the above embodiment.

The monitoring unit 40 detects overall quality of service of a multi-core neural network processor and a working state of each core, for example, a utilization rate, workload, working frequency, the count of tasks in a private task queue in the core and task completion time of each core in real time.

The task scheduling unit 50 selects a task to be scheduled from the unscheduled tasks, determines a mapping relationship between a task to be unscheduled and a target core according to information about the task to be scheduled and the working state of each core, and allocates the task to be scheduled to a target core.

The task scheduling unit 50 may schedule tasks to be scheduled in the task queues at a time interval T, in which T may be a real number greater than 0. If a task t to be scheduled forms a dependency relationship with another task and a precursor task is not completed, the task scheduling unit 50 may not schedule the task t.

The task scheduling unit 50 may select the task to be scheduled from the unscheduled tasks in at least one of the following manners. A task is selected randomly. The task of which estimated execution time is longest may be selected. The task of which the estimated execution time is shortest may be selected. The task occupying most resources and selecting the task occupying fewest resources may be selected.

The task scheduling unit 50 may allocate and schedule the task to be scheduled to the target core in at least one of the following scheduling manners.

The first scheduling manner is to make statistics on the count of the tasks in the private task queue of each core, select the core with the fewest tasks in the private task queue as the target core and allocate the task to be scheduled to the target core.

The second scheduling manner is to make statistics on the time for completion of all the tasks in the private task queue of each core, select the core of which the task completion time is shortest as the target core and allocate the task to be scheduled to the target core.

The third scheduling manner is to make statistics on a distribution condition of resources required by the task to be scheduled in all the cores, select the core with the most resources as the target core and allocate the task to be scheduled to the target core.

The fourth scheduling manner is to allocate the task to be scheduled to the target core by adopting a heuristic algorithm, in which the heuristic algorithm includes, but is not limited to, a genetic algorithm, an ant colony algorithm and a simulated annealing algorithm.

Figure 3:
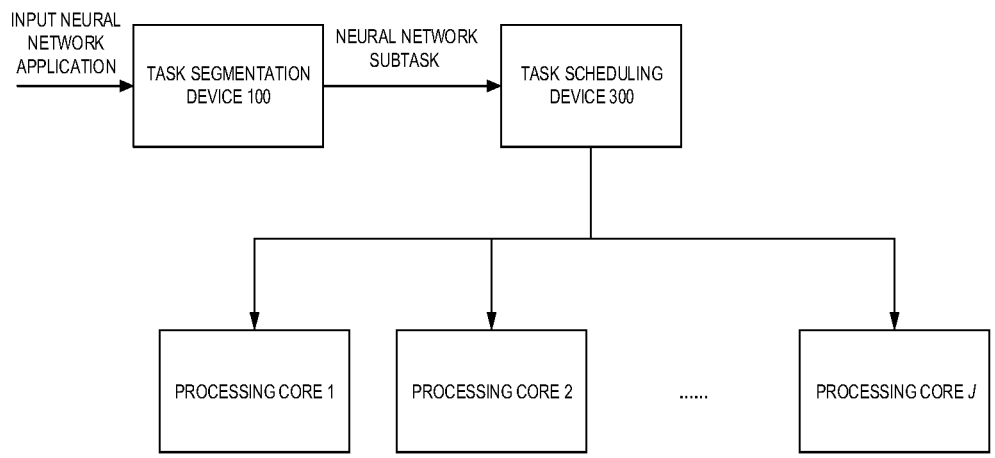
FIG. 3 is a structure block diagram of a multi-core processor according to yet another embodiment of the disclosure.

Another embodiment of the disclosure provides a multi-core processor, for example, a multi-core neural network processor. FIG. 3 is a structure block diagram of a multi-core processor according to another embodiment of the disclosure. As illustrated in FIG. 3, the multi-core neural network processor 1000 may include J processing cores, in which J may be a positive integer greater than 1, and the task segmentation device 100 and task scheduling device 300 in the above-mentioned embodiments.

The task segmentation device 100 segments an input neural network application in a manner that subtasks obtained by segmentation may meet system real-time performance. The task scheduling device 300 may perform neural network subtask scheduling and may improve quality of service, increase utilization rates of the cores, ensure task balance between the processing cores and reduce energy consumption. The neural network processing cores may perform neural network computation to complete the neural network subtasks. A topological structure between the J neural network processing cores may include, but is not limited to, a one-dimensional linear structure, a two-dimensional mesh structure, a two-dimensional star structure, a three-dimensional cube structure and the like.

Figure 4:
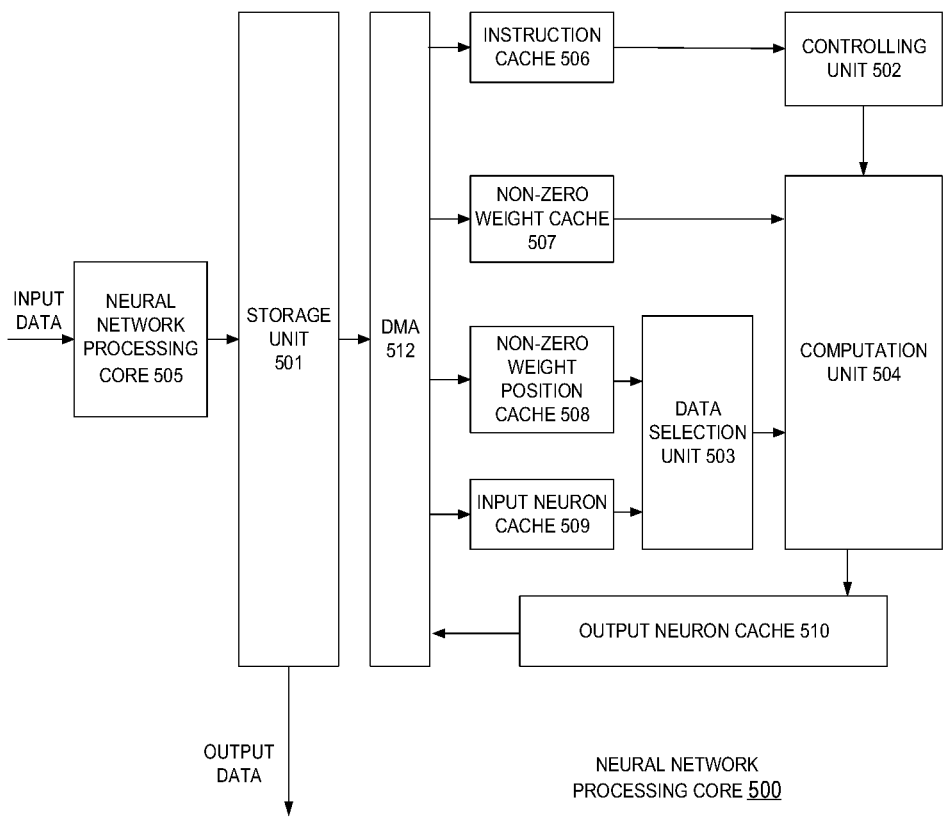
FIG. 4 is a structure block diagram of each neural network processing core for neural network processing according to yet another embodiment of the disclosure.

FIG. 4 is a structure block diagram of each neural network processing core for neural network processing according to another embodiment of the disclosure. As illustrated in FIG. 4, the neural network processing core 500 may include a storage unit 501, a controlling unit 502, a data selection unit 503 and a computation unit 504.

The storage unit 501 may be configured to store neurons, weights and instructions of a neural network. When a neural network subtask processes a sparse neural network, the stored weights are non-zero weights and position information of non-zero weights.

The instruction controlling unit 502 may be configured to receive a neural network-dedicated instruction and decode it to generate control information to control the data selection unit and the computation unit.

The neural network dedicated instruction may include any instruction dedicated to completion of artificial neural network computation. The neural network dedicated instruction may include, but is not limited to, a control instruction, a data transfer instruction, a computational instruction and a logical instruction. The control instruction controls a neural network execution process. The data transfer instruction completes data transfer between different storage media, and a data format may include, but is not limited to, a matrix format, a vector format and a scalar format. The computational instruction completes an arithmetic computation of the neural network, and may include, but is not limited to, a matrix computational instruction, a vector computational instruction, a scalar computational instruction, a convolutional neural network computational instruction, a fully connected neural network computational instruction, a pooling neural network computational instruction, an RBM neural network computational instruction, an LRN neural network computational instruction, an LCN neural network computational instruction, an LSTM neural network computational instruction, an RNN computational instruction, an RELU neural network computational instruction, a PRELU neural network computational instruction, a SIGMOID neural network computational instruction, a TANH neural network computational instruction and a MAXOUT neural network computational instruction. The logical instruction completes logical computation of the neural network, and may include, but is not limited to, a vector logical computational instruction and a scalar logical computational instruction.

The RBM neural network computational instruction may be configured to implement RBM neural network computation.

The LRN neural network computational instruction may be configured to implement LRN neural network computation.

The LSTM neural network computational instruction may be configured to implement LSTM neural network computation.

The RNN computational instruction may be configured to implement RNN computation.

The RELU neural network computational instruction may be configured to implement RELU neural network computation.

The PRELU neural network computational instruction may be configured to implement PRELU neural network computation.

The SIGMOID neural network computational instruction may be configured to implement sigmoid growth curve (SIGMOID) neural network computation.

The TANH neural network computational instruction may be configured to implement hyperbolic tangent function (TANH) neural network computation.

The MAXOUT neural network computational instruction may be configured to implement MAXOUT neural network computation.

More specifically, the neural network dedicated instruction may include a Cambricon instruction set.

The Cambricon instruction set is characterized in that the length of each instruction in the instruction set is 64 bit and each instruction consists of an operation code and an operand. The instruction set may include four types of instructions, in other words control instructions, data transfer instructions, computational instructions and logical instructions.

Further, the control instructions may be configured to control an execution process. The control instructions may include a jump instruction and a conditional branch instruction.

Further, the data transfer instructions may be configured to complete data transfer between different storage media. The data transfer instructions may include a load instruction, a store instruction and a move instruction. The load instruction may be configured to load data from a main memory to a cache, the store instruction may be configured to store the data from the cache to the main memory, and the move instruction may be configured to move the data between the cache and another cache or the cache and a register or the register and another register. The data transfer instruction supports three different data organization manners, including the matrix, the vector and the scalar.

Further, the computational instructions may be configured to complete the arithmetic computations of the neural network. The computational instructions may include a matrix computational instruction, a vector computational instruction and a scalar computational instruction.

Furthermore, the matrix computational instruction may be configured to complete matrix computation in the neural network, including matrix multiply vector computation, vector multiply matrix computation, matrix multiply scalar computation, outer product computation, matrix add matrix computation and matrix subtract matrix computation.

Furthermore, the vector computational instruction may be configured to complete vector computation in the neural network, including vector elementary arithmetic, vector transcendental functions computation, dot product computation, random vector generator computation and maximum/minimum of a vector computation, where the vector elementary arithmetic computation may include vector addition, subtraction, multiplication and division, and the vector transcendental functions refer to those functions which do not meet any polynomial equations taking polynomials as coefficients, and may include, but are not limited to, an exponential function, a logarithmic function, a trigonometric function and an anti-trigonometric function.

Furthermore, the scalar computational instruction may be configured to complete scalar computation in the neural network, including scalar elementary arithmetic and scalar transcendental functions computation, where the scalar elementary arithmetic computation may include scalar addition, subtraction, multiplication and division, and the scalar transcendental functions refer to those functions which do not meet any polynomial equations taking polynomials as coefficients, and may include, but are not limited to, an exponential function, a logarithmic function, a trigonometric function and an anti-trigonometric function.

Further, the logical instructions may be configured for the logical computation of the neural network. The logical instructions may include vector logical computational instructions and scalar logical computational instructions.

Furthermore, the vector logical computational instructions may include vector compare instructions, vector logical operations instructions and vector greater than merge instructions, where "vector compare" may include, but is not limited to, greater than, less than, equal to, greater than or equal to, less than or equal to and unequal to; and the vector logical operations may include AND, OR and NOT.

Furthermore, the scalar logical computational instructions may include scalar compare instructions and scalar logical operations instructions, where "scalar compare" may include, but is not limited to, greater than, less than, equal to, greater than or equal to, less than or equal to and unequal to; and the scalar logical operations may include AND, OR and NOT.

The data selection unit 503 may be configured to receive input neurons and the position information of non-zero weights, and select neurons corresponding to the non-zero weights. In other words, for each output neuron data, the data selection unit removes input neuron data which have no non-zero weight data corresponding to the output neuron data.

The computation unit 504 may be configured to receive the neurons corresponding to the input non-zero weights and the corresponding non-zero weights, complete neural network training computation and retransmit the output neurons to a storage part.

Specifically, the computation unit 504 may perform corresponding computation on the data according to the instruction stored in the storage unit. The computation unit 504 may include, but is not limited to, three parts, where a first part may include a multiplier, a second part may include one or more adders and a third part may include an activation function unit. Preferably, the one or more adders of the second part form an adder tree. The first part multiplies input data 1 (in1) and input data 2 (in2) to obtain multiplied output (out), and a process is represented with out=in1×in2. The second part adds the input data 1 (in1) through the adder tree step by step to obtain output data (out), where in1 is a vector with a length N, in which N may be greater than 1, and a process is represented with out=in1[1]+in1[2]+ . . . +in1 [N]; and/or the input data 1 (in1) is accumulated through the adder tree and then is added with the input data 2 (in2) to obtain the output data (out), and a process is represented with out=in1[1]+in1[2]+ . . . +in1 [N]+in2; or the input data 1 (in1) and the input data 2 (in2) are added to obtain the output data (out), and a process is represented with out=in1+in2. The third part may perform an activation function computation on the input data (in) to obtain activation output data (out), and a process is represented with out=active(in), where the activation function may be sigmoid, tan h, relu, softmax and the like. Besides an activation operation, the third part may implement another nonlinear function and may perform computation (f) on the input data (in) to obtain the output data (out): out=f(in).

The computation unit may further include a pooling unit. The pooling unit may perform pooling computation on the input data (in) to obtain output data (out) pooled, and the process is out=pool(in), where pool is the pooling operation, which may include but is not limited to: avgpooling, maxpooling and median pooling, and the input data (in) is the data related to the output (out) in a pooling core.

The computation unit may perform, but is not limited to, the following computation. The first part multiplies the input data and the input data to obtain multiplied data. The second part may perform adder tree computation to add the input data through the adder tree step by step or add the input data and the input data to obtain the output data, the third part may perform the activation function computation, performing the activation function computation on the input data to obtain the output data. The computation of the abovementioned parts may be freely combined, thereby implementing computation of various functions.

The neural network processing core 500 may further include a preprocessing module 505. As illustrated in FIG. 4, the module preprocesses original data, including segmentation, Gaussian filtering, binarization, regularization, normalization and the like.

The neural network processing core 500 may further include an instruction cache 506, a non-zero weight cache 507, a non-zero weight position cache 508, an input neuron cache 509 and an output neuron cache 510. The instruction cache 506 may be configured to store a dedicated instruction. The non-zero weight cache 507 may be configured to cache the non-zero weight data. The non-zero weight position cache 508 may be configured to cache non-zero weight position data and make each weight in input data to be in a one-to-one correspondence with the input neurons according to the non-zero weight position data. The input neuron cache 509 may be configured to cache the input neurons. The output neuron cache 510 may be configured to cache the output neurons output by the computation unit.

The non-zero weight position data indicates whether each input neuron data and each output neuron data have corresponding weight data of non-zero weights or not.

In one case, a method for making each weight in input data to be in a one-to-one correspondence with the input neurons by the non-zero weight position cache is to adopt 1 to represent existence of a connection and adopt 0 to represent no connection, and form a character string of 0 and 1 by connection states of an output neuron in each group and all the input neurons to represent a connection relationship of the output neuron. In another case, a method for one-to-one correspondence of the cached non-zero weight positions under another condition is to adopt 1 to represent existence of a connection and adopt 0 to represent no connection, and form a character string of 0 and 1 by connection states of an input neuron in each group and all the output neurons to represent a connection relationship of the input neuron. In another case, a method for one-to-one correspondence of the cached non-zero weight positions under another condition is to obtain a distance between an input neuron corresponding to a first connection of an output neuron in a group and a first input neuron, a distance between an input neuron of the output neuron in a second group and a corresponding previous input neuron, a distance between an input neuron of the output neuron in a third group and a corresponding previous input neuron, and so on until all the input neurons of the output neuron are exhausted to represent a connecting relationship of the output neuron.

Existence of the connection refers to that each input neuron data and each output neuron data have corresponding non-zero weight data. No connection refers to the input neuron data and the output neuron data do not have the corresponding non-zero weight data or not.

The neural network processing core 500 may further include a DMA 512.

The DMA may be configured to read/write the data or the instruction in the storage unit, the instruction cache, the non-zero weight cache, the non-zero weight position cache, the input neuron cache and the output neuron cache.

In some embodiments, a chip is provided, which may include the abovementioned neural network processor.

In some embodiments, a chip packaging structure is provided, which may include the abovementioned chip.

In some embodiments, a board card is provided, which may include the abovementioned chip packaging structure.

In some embodiments, an electronic device is provided, which may include the abovementioned board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance and/or medical equipment.

The transportation means may include an airplane, a ship and/or a vehicle. The household electrical appliance may include a television, an air conditioner, a microwave oven, a refrigerator, an electric rice cooker, a humidifier, a washing machine, an electric lamp, a gas cooker and a range hood. The medical equipment may include a nuclear magnetic resonance spectrometer, a B-ultrasonic scanner and/or an electrocardiograph.

Another embodiment of the disclosure provides a task segmentation method, which is used for a neural network. At least one of the following five granularity task segmentation manners is selected for task segmentation.

In a first granularity task segmentation manner, the whole task is taken as a subtask. Specifically, completion of calculation for M samples is taken as a subtask. In such a task segmentation manner, only one subtask is generated, and there is no dependency relationship between subtasks.

In a second granularity task segmentation manner, completion of calculation for a plurality of samples is taken as a subtask. The neural network is segmented into m subtasks, and the $j^{th}$ task completes calculation for Mi samples, where m is a positive integer greater than 1 and less than or equal to M, 1=1, 2, 3, ... m, Mi is a positive integer greater than 0 and less than M, and M1+M2+ ... +Mm=M is met. There is no dependency relationship between the m subtasks obtained in such a task segmentation manner.

In a third granularity task segmentation manner, task segmentation may be performed on a neural network application according to layer types of the neural network, in which calculation for layers of the same type may be taken as a task. The layer types of the neural network may include, but are not limited to, a convolutional layer, a fully connected layer, an LSTM layer, a pooling layer, an active layer, an LRN layer and a BN layer. There is a complex dependency relationship between subtasks obtained in such a task segmentation manner.

In a fourth granularity task segmentation manner, task segmentation may be performed on the neural network application according to an interlayer structure of the neural network, in which calculation for a plurality of adjacent layers may be taken as a subtask. The neural network application is segmented into n subtasks, a first subtask completes calculation for a first layer to $N1^{th}$ layer, total N1 layers, of the neural network, a second subtask completes neural network calculation for an $(N1+1)^{th}$ layer to an (N1+N2)th layer, total N2 layers, and an $i^{th}$ subtask completes calculation for an $(N1+ \ldots +N1-1+1)^{th}$ layer to an $(N1+ \ldots +N1)^{th}$ layer, total Ni layers, where n is a positive integer greater than 0 and less than or equal to N, 1=1, 2, 3, ... n, Ni is a positive integer greater than 0 and less than or equal to N and N1+N2+ ... +Ni+ ... +Nn=N is met. There is a chain dependency relationship between the subtasks obtained in such a task segmentation manner, where the $i^{th}$ subtask is a precursor task of an (i+1)th subtask, the (i+1)th subtask is a subsequent task of the $i^{th}$ task, and execution of the $(i+1)^{th}$ task may be started only after the $i^{th}$ task is completed.

In a fifth granularity task segmentation manner, task segmentation may be performed on the neural network application according to intra-layer structures of the neural network, and calculation in the layers of the neural network may be further segmented into subtasks. Segmentation according to calculation in the layers of the neural network may include, but is not limited to, task segmentation on convolutional layer calculation, fully connected layer calculation, pooling layer calculation or active layer calculation of the neural network.

Furthermore, an embodiment of the disclosure provides a task scheduling method. Task scheduling may be implemented in comprehensive consideration of a dependency relationship between tasks, task locality, a task segmentation granularity, and running frequencies and loads of cores to improve quality of service, increase utilization rates of the cores, ensure task balance between the cores and reduce energy consumption. The task scheduling method may include the following steps.

All unscheduled neural network tasks are cached.

Specifically, execution time of each task to be scheduled, a task dependency relationship diagram and a processing distribution condition of task resources in the cores may be selectively stored, and the neural network tasks are, for example, the subtasks segmented in the above embodiment.

Overall quality of service of a multi-core neural network processor and a working state of each core are detected in real time.

Specifically, the working state of each core is, for example, a utilization rate, workload, working frequency, the count of tasks in a private task queue in the core and task completion time of each core.

A task to be scheduled is selected from the unscheduled tasks, a mapping relationship between a task to be scheduled and a target core is determined according to information about the task to be scheduled and the working state of each core, and the task to be scheduled is allocated to a target core.

During task scheduling, tasks to be scheduled in the task queues may be scheduled at a time interval T, in which T may be a real number greater than 0. If a task t to be scheduled forms a dependency relationship with another task and a precursor task is not completed, the task t is not scheduled.

A manner for selecting the task to be scheduled from the unscheduled tasks may adopt at least one of the following manners: randomly selecting a task, selecting the task of which estimated execution time is the longest, selecting the task of which the estimated execution time is the shortest, selecting the task occupying the most resources and selecting the task occupying the fewest resources.

The task to be scheduled may be allocated and scheduled to the target core in at least one of the following scheduling manners. A first scheduling manner is to make statistics on the count of the tasks in the private task queue of each core, select the core with the fewest tasks in the private task queue as the target core and allocate the task to be scheduled to the target core.

The second scheduling manner is to make statistics on the time for completion of all the tasks in the private task queue of each core, select the core of which the task completion time is the shortest as the target core and allocate the task to be scheduled to the target core.

A third scheduling manner is to make statistics on a distribution condition of resources required by the task to be scheduled in all the cores, select the core with the most resources as the target core and allocate the task to be scheduled to the target core.

A fourth scheduling manner is to allocate the task to be scheduled to the target core by adopting a heuristic algorithm, in which the heuristic algorithm includes, but is not limited to, a genetic algorithm, an ant colony algorithm and a simulated annealing algorithm.

The processes or methods described in the abovementioned drawings may be performed by processing logics including hardware (for example, a circuit and a dedicated logic), firmware and software (for example, software born on a non-transitory computer-readable medium) or a combination of two. Although the processes or methods have been described above according to some sequential operations, it should be understood that some described operations may be performed in different sequences. In addition, some operations may be performed not sequentially but concurrently.

The electronic equipment may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance and/or medical equipment.

The transportation means may include an airplane, a ship and/or a vehicle; the household electrical appliance may include a television, an air conditioner, a microwave oven, a refrigerator, an electric rice cooker, a humidifier, a washing machine, an electric lamp, a gas cooker and a range hood; and the medical equipment may include a nuclear magnetic resonance spectrometer, a B-ultrasonic scanner and/or an electrocardiograph.

Each functional unit/module/submodule/subunit in the disclosure may be hardware. For example, the hardware may be a circuit, including a digital circuit, an analogue circuit and the like. Physical implementation of a hardware structure may include, but is not limited to, a physical device, and the physical device may include, but not limited to, a transistor, a memristor and the like. The calculating module in the calculation device may be any proper hardware processor, for example, a CPU, a GPU, an FPGA, a DSP and an ASIC. The storage unit may also be any proper magnetic storage medium or magneto-optical storage medium, for example, an RRAM, a DRAM, an SRAM, an EDRAM, an HBM and an HMC.

Those skilled in the art may clearly know that, for convenient and brief description, descriptions are only made with division of each of the abovementioned functional modules as an example and the abovementioned functions may be allocated to different functional modules for realization according to a requirement during a practical application, in other words, an internal structure of the device is divided into different functional modules to realize all or part of the functions described above.

The purposes, technical solutions and beneficial effects of the disclosure are further described above with the specific embodiments in detail. It should be understood that the above is only the specific embodiment of the disclosure and not intended to limit the disclosure. Any modifications, equivalent replacements, improvements and the like made within the spirit and principle of the disclosure shall fall within the scope of protection of the disclosure.

What is claimed:

1. A task segmentation device for a neural network, comprising:
a granularity task segmentation circuit configured to segment a task into one or more subtasks in accordance with at least one granularity; and
a task segmentation granularity selection circuit configured to determine the granularity for segmenting the task,
wherein the granularity task segmentation circuit includes at least one of a first granularity task segmentation circuit configured to identify the task as one of the one or more subtasks,
a second granularity task segmentation circuit configured to:
divide sample data associated with the task into one more subsets of sample data, and
identify a computation of each subset of sample data as one of the one or more subtasks,
a third granularity task segmentation circuit configured to segment the task according to layer types of the neural network, wherein computation for layers of the same layer type is identified as one of the one or more subtasks,
a fourth granularity task segmentation circuit configured to segment the task according to an interlayer structure of the neural network, wherein computation for multiple adjacent layers is identified as one of the one or more subtasks, and
a fifth granularity task segmentation circuit configured to segment the task according to intra-layer structures of the neural network to segment computation types in each of the layers of the neural network into subtasks.

2. The task segmentation device of claim 1, wherein the task segmentation granularity selection circuit is configured to select at least one of the first to fifth granularity task segmentation circuits for task segmentation on the basis of at least one of the count of samples to be processed of the neural network, a topological structure of the neural network, and a computation amount of each layer.

3. The task segmentation device of claim 1, wherein the fifth granularity task segmentation circuit is further configured to
segment the task based on computation types including convolutional layer computation, fully connected layer computation, pooling layer computation, or active layer computation of the neural network.

4. The task segmentation device of claim 3, wherein the fifth granularity task segmentation circuit is configured to identify the convolutional layer computation as one of the subtasks by performing segmentation on output neurons according to a block size of (Bfout, Bxout, Byout), and simultaneously performing segmentation on weights according to a block size of (Bfout, Bfin, Bx, By), where all of Bfout, Bxout, Byout, Bfout, Bfin, Bx and By are positive integers, and $0<Bfout \leq Nfout$, $0<Bxout \leq Nxout$, $0<Byout \leq Nyout$, $0<Bfin \leq Nfin$, $0<Bx \leq K$ and $0<By \leq Ky$; when input neurons of a convolutional layer of the neural network form a three-dimensional matrix (Nfin, Nxin, Nyin), weights form a four-dimensional matrix (Nfout, Nfin, Kx, Ky), output neurons form a three-dimensional matrix (Nfout, Nxout, Nyout), where Nfin represents the count of input feature image, (Nxin, Nyin) represents a size of input feature image, Nfout represents the count of output feature image, (Kx, Ky) represents a size of convolution kernel, (Nxout, Nyout) represents an output feature image size, and all of Nfin, Nxin, Nyin, Kx, Ky, Nfout, Nxout, and Nyout are positive integers.

5. A task processing device, comprising:
a task segmentation device including:
a granularity task segmentation circuit configured to segment a task into one or more subtasks in accordance with at least one granularity; and
a task segmentation granularity selection circuit configured to determine the granularity for segmenting the task,
wherein the granularity task segmentation circuit includes at least one of a first granularity task segmentation circuit configured to identify the task as one of the one or more subtasks,
a second granularity task segmentation circuit configured to:
divide sample data associated with the task into one more subsets of sample data, and
identify a computation of each subset of sample data as one of the one or more subtasks,
a third granularity task segmentation circuit configured to segment the task according to layer types of the neural network, wherein computation for layers of the same layer type is identified as one of the one or more subtasks,
a fourth granularity task segmentation circuit configured to segment the task according to an interlayer structure of the neural network, wherein computation for multiple adjacent layers is identified as one of the one or more subtasks, and
a fifth granularity task segmentation circuit configured to segment the task according to intra-layer structures of the neural network to segment computation types in each of the layers of the neural network into subtasks; and
a task scheduling device that includes:
a task queue circuit configured to cache unscheduled tasks;
a monitoring circuit configured to monitor a working state of each core of a multi-core processor in real time; and
a task scheduling circuit configured to:
select a task to be scheduled from the unscheduled tasks, and
allocate and schedule the task to be scheduled to a target core according to the working state of each core.

6. The task processing device of claim 5, wherein the task scheduling circuit is configured to count a number of tasks in a private task queue of each core and selecting the core with the fewest tasks in the private task queue as the target core.

7. The task processing device of claim 5, wherein the task scheduling circuit is configured to track time for completion of all the tasks in a private task queue of each core and selecting the core of which the task completion time is shortest as the target core.

8. The task processing device of claim 5, wherein the task scheduling circuit is configured to monitor a distribution condition of resources required by the task to be scheduled in all the cores and selecting the core with the most resources as the target core.

9. The task processing device of claim 5, wherein the task scheduling circuit is configured to allocate
the task to be scheduled to the target core by adopting a heuristic algorithm.

10. The task processing device of claim 5, wherein the task scheduling circuit is configured to perform task scheduling at a time interval, and select the task to be scheduled in at least one of the following manners:
  randomly selecting an unscheduled task,
  selecting the unscheduled task of which estimated execution time is longest,
  selecting the unscheduled task of which the estimated execution time is shortest,
  selecting the unscheduled task occupying most resources, and
  selecting the unscheduled task occupying fewest resources.

11. The task processing device of claim 5, wherein the working state of each core includes at least one of a utilization rate, a workload, a working frequency, a count of the tasks in a private task queue in the core, and the task completion time in the core.

12. A task segmentation method for a neural network, comprising:
  segmenting, by a granularity task segmentation circuit, a task into one or more subtasks in accordance with at least one granularity, wherein the segmenting further includes:
    identifying, by at least one of a first granularity task segmentation circuit, the task as one of the one or more subtasks,
    dividing, by a second granularity task segmentation circuit, sample data associated with the task into one more subsets of sample data,
    identifying, by the second granularity task segmentation circuit, a computation of each subset of sample data as one of the one or more subtasks,
    segmenting, by a third granularity task segmentation circuit, the task according to layer types of the neural network, wherein computation for layers of the same layer type is identified as one of the one or more subtasks,
    segmenting, by a fourth granularity task segmentation circuit, the task according to an interlayer structure of the neural network, wherein computation for multiple adjacent layers is identified as one of the one or more subtasks,
    segmenting, by a fifth granularity task segmentation circuit, the task according to intra-layer structures of the neural network to segment computation types in each of the layers of the neural network into subtasks; and
  determining, by a task segmentation granularity selection circuit, the granularity for segmenting the task.

13. The task segmentation method of claim 12, wherein the task segmentation is performed by selecting at least one circuit in a task segmentation device for task segmentation on the basis of at least one of the count of samples to be processed of the neural network, a topological structure of the neural network, and a computation amount of each layer.

14. The task segmentation method of claim 12, wherein performing task segmentation according to intra-layer structures of the neural network includes:
  performing task segmentation on convolutional layer computation, fully connected layer computation, pooling layer computation or active layer computation of the neural network.

15. The task segmentation method of claim 14, wherein performing segmentation on convolutional layer computation of the neural network includes:
  performing segmentation on output neurons according to a block size of (Bfout, Bxout, Byout), and simultaneously performing segmentation on weights according to a block size of (Bfout, Bfin, Bx, By), where all of Bfout, Bxout, Byout, Bfout, Bfin, Bx and By are positive integers, $0<Bfout\leq Nfout$, $0<Bxout\leq Nxout$, $0<Byout\leq Nyout$, $0<Bfin\leq Nfin$, $0<Bx\leq K$ and $0<By\leq Ky$, when input neurons of a convolutional layer of the neural network form a three-dimensional matrix (Nfin, Nxin, Nyin), weights form a four-dimensional matrix (Nfout, Nfout, Kx, Ky) and output neurons form a three-dimensional matrix (Nfout, Nxout, Nyout), where Nfin represents the count of input feature image, (Nxin, Nyin) is a size of input feature image, Nfout represents the count of output feature image, (Kx, Ky) represents a convolution kernel size, (Nxout, Nyout) represents a size of output feature image and all of Nfin, Nxin, Nyin, Kx, Ky, Nfout, Nxout, Nyout are positive integers.

* * * * *